United States Patent Office 3,476,758
Patented Nov. 4, 1969

3,476,758
**11-(4-PIPERIDYL)DIBENZO[a,d]
CYCLOHEPTADIENES**
Jean Clement Louis Fouché, Bourg-la-Reine, France, assignor to Rhone-Poulenc S.A., Paris, France, a French body corporate
No Drawing. Filed Aug. 24, 1966, Ser. No. 574,544
Claims priority, application France, Aug. 31, 1965, 29,968; Feb. 4, 1966, 48,524; July 21 1966, 70,349
Int. Cl. C07d 29/36, 29/10, 29/12
U.S. Cl. 260—293
8 Claims

ABSTRACT OF THE DISCLOSURE

The invention provides new substituted 11-(4-piperidyl)dibenzo[a,d]cycloheptadiene derivatives and their salts which are useful, e.g. as tranquilizers, neuroleptics, sedatives, antihistaminics, antiserotoninics, antiallergics, antimigraines, antiemetics and analgesics.

This invention relates to dibenzo[a,d]cycloheptadiene derivatives, their preparation, and pharmaceutical compositions containing the same.

The present invention provides, as new compounds, the dibenzo[a,d]cycloheptadiene derivatives of the formula:

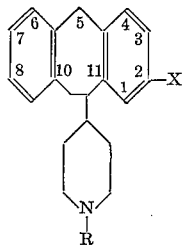

(I)

and their acid addition and quaternary ammonium salts, in which R is hydrogen, alkyl of 1 to 5 carbon atoms, alkenyl of 2 to 5 carbon atoms, alkynyl of 2 to 5 carbon atoms, hydroxyalkyl of 1 to 5 carbon atoms, hydroxyalkoxyalkyl of 1 to 5 carbon atoms in each alkyl residue, or aralkyl of 1 to 5 carbon atoms in the alkyl residue and optionally substituted in the aryl nucleus by one or more of halogen, alkyl of 1 to 5 carbon atoms, alkoxy of 1 to 5 carbon atoms, amino or trifluoromethyl, and X is hydrogen, halogen, trifluoromethyl, alkyl of 1 to 5 carbon atoms, alkoxy of 1 to 5 carbon atoms, or alkylthio of 1 to 5 carbon atoms. Throughout this specification the dibenzo[a,d]cycloheptadiene (and corresponding cycloheptatriene) nucleus is numbered as above, irrespective of whether X represents hydrogen or a substituent other than hydrogen.

Especially valuable compounds of Formula I are those in which X is hydrogen, halogen, alkoxy of 1 to 5 carbon atoms, or alkylthio of 1 to 5 carbon atoms, and R is alkyl of 1 to 5 carbon atoms, or phenylalkyl of 1 to 5 carbon atoms in the alkyl residue, the phenyl nucleus being unsubstituted or substituted by an alkoxy radical of 1 to 5 carbon atoms, and their acid addition and quaternary ammonium salts.

The compounds of Formula I in which R is other than hydrogen may be prepared by a process which comprises reacting a compound of the formula:

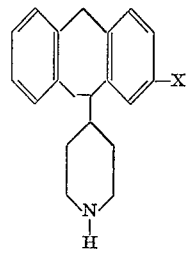

(II)

in which X is as defined above, with a reactive ester of the formula:

Y—R (III)

in which R is as defined above but does not represent hydrogen, and Y represents a reactive ester residue such as a halogen atom or a sulphuric or sulphonic ester residue, for example a methoxysulphonyloxy, methanesulphonyloxy or p-toluenesulphonyloxy residue.

It is of advantage to work in an inert organic solvent such as ethanol or dimethylformamide, preferably at the boiling point, and to use as condensation agent an alkali metal derivative, such as sodium bicarbonate or sodium carbonate, or a tertiary organic base.

Alternatively, the compounds of Formula I in which R is other than hydrogen, alkenyl, or alkynyl may be prepared by reducing a compound of the formula:

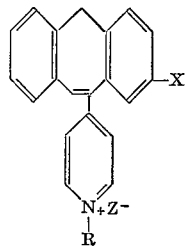

(IV)

in which X is as defined above, Z⁻ represents an anion such as a halogen ion or a sulphate half ester ion, and R is as defined above but does not represent hydrogen or an ankenyl or alkynyl radical. This reduction is conveniently carried out by catalytic hydrogenation in an aqueous alcoholic medium at ambient pressures and temperatures in the presence of platinum as catalyst.

The dibenzo[a,d]cycloheptatriene derivatives of Formula IV may be obtained by quaternisation of dibenzo[a,d]cycloheptatriene derivatives of the formula:

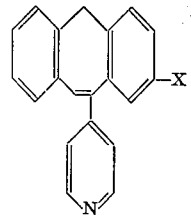

(V)

in which X is as defined above, with a reactive ester of the formula:

Z—R (VI)

in which Z and R are as defined above in connection with Formula IV. The quaternisation can be carried out in an organic solvent at ambient temperatures or, more rapidly, with heating.

The dibenzo[a,d]cycloheptatriene derivatives of Formula V may in turn be obtained by dehydration of dibenzo[a,b]cycloheptadiene derivative of formula:

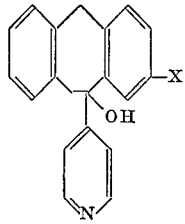

(VII)

in which X is as defined above. This dehydration may be achieved by the usual methods of dehydration of tertiary alcohols. It is advantageously carried out by heating the compound of Formula VII in an aqueous or aqueous-organic medium in the presence of a strong acid such as methanesulphonic acid at a temperature between 50° C. and the reflux temperature of the reaction medium. The dehydration may also be carried out with an acid anhydride.

The compounds of Formula VII may be prepared by reacting pyridyl lithium with an 11-oxo-dibenzo[a,d]cycloheptadiene of the formula:

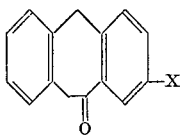

(VIII)

in which X is as defined above. The reaction is advantageously carried out in ether at a temperature of −70° C.

The ketones of Formula VIII may be prepared by cyclising compounds of the formula:

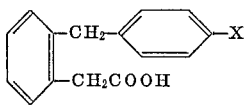

(IX)

in which X is as defined above. This cyclisation is advantageously carried out by heating the compound of Formula IX in the presence of polyphosphoric acid or of its esters, preferably to a temperature of 60° to 180° C. It is also possible to convert the compounds of Formula IX into the corresponding acid chlorides by the usual methods and then to cyclise the latter by a Friedel-Crafts reaction, for example, with aluminium chloride in a solvent such as carbon disulphide.

The acids of Formula IX may themselves be prepared by esterifying an acid of the formula:

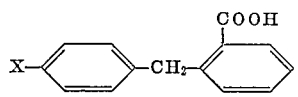

(X)

with methanol, and then reducing the ester obtained to the compound of formula:

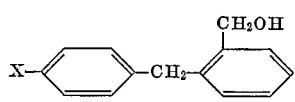

(XI)

which is treated with a halogenating reagent to produce the compound of formula:

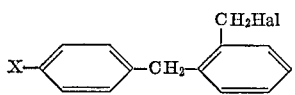

(XII)

in which X is as defined above and Hal represents a halogen atom, preferably chlorine or bromine. Finally, the compound of Formula XII is reacted with an alkali metal cyanide and the compound of the formula:

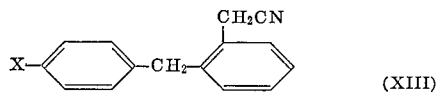

(XIII)

so obtained is hydrolysed.

The compounds of Formula I where R represents a hydrogen atom may be prepared by debenzylation of compounds of Formula I in which R is benzyl by the usual methods, that is to say by catalytic hydrogenation in the presence of palladium on charcoal as catalyst, using an alcohol as solvent, at 50 to 100 bars pressure and at a temperature of 50° to 100° C.

The compounds of Formula I may optionally be purified by physical methods (such as distillation, crystallisation or chromatography) or by chemical methods (such as salt formation, crystallisation of the latter, and decomposition of the salts in an alkaline medium). In these processes the nature of the anion of the salt is unimportant, the only condition being that the salt should be well defined and easily crystallisable.

The new compounds may be converted into acid addition and quaternary ammonium salts. The acid addition salts may be obtained by reacting the new compounds with acids in appropriate solvents. For example, alcohols, ethers, ketones or chlorinated solvents may be used as the organic solvents; the resulting salt precipitates, after optional concentration of its solution, and is separated off by filtration or decantation. The quaternary ammonium salts may be obtained by reacting the new compounds with inorganic or organic esters, optionally in an organic solvent, at ordinary temperatures or, more rapidly, with gentle heating.

The new compounds, and their acid addition and quaternary ammonium salts, have interesting pharmacodynamic properties. In particular, they exert a strong effect on the central nervous system, acting as tranquillisers, neuroleptics and sedatives; they also have antihistaminic, antiserotoninic, antiallergic, antimigraine, anti-emetic and analgesic effects.

For medicinal use, the new compounds may be employed either as the bases or as pharmaceutically acceptable acid addition or quaternary ammonium salts, that is to say salts which are non-toxic at the dosages used. Examples of pharmaceutically acceptable acid addition salts are salts of mineral acids (such as hydrochlorides, sulphates, nitrates and phosphates) and organic acids (such as acetates, propionates, succinates, benzoates, fumarates, maleates, theophylline-acetates, salicylates, phenolphthalinates, and methylene bis-β-hydroxynaphthoates), or the substitution derivatives of these acids. Pharmaceutically acceptable quaternary ammonium salts include derivatives of inorganic and organic esters, such as methyl chloride, bromide or iodide, ethyl chloride, bromide, or iodide, allyl chloride, bromide or iodide, benzyl chloride, bromide or iodide, methyl or ethyl sulphates or benzenesulphonates, and substitution derivatives of these compounds.

The following examples illustrate the invention (temperatures are in ° C. throughout).

EXAMPLE 1

A solution of 1 - methyl - 4 - (11 - dibenzo[a,d]cycloheptatrienyl)-pyridinium bromide (14.1 g.) in a mixture of ethanol (200 cm.³) and distilled water (60 cm.³) is hydrogenated at ambient pressure and temperature in the presence of an Adams platinum catalyst (1.4 g.). The hydrogenation is complete after 5 hours. (4 moles of hydrogen are absorbed per mole of bromide starting material.) After filtering off the catalyst, the ethanol is evaporated. The residue is taken up in a mixture of distilled water (150 cm.³) and a 2 N aqueous solution of methanesulphonic acid (50 cm.³). The resulting solution is washed with ether (100 cm.³) and then rendered alkaline with caustic soda solution (15 cm.³, d.=1.33). The oil which separates out is extracted twice with ether (total 400 cm.³). The combined ethereal extracts are dried over anhydrous potassium carbonate and evaporated. The residue (13.3 g.) is dissolved in boiling acetonitrile (40 cm.³). After cooling for two hours to 3°, the crystals formed are filtered off, washed twice with ice-cold acetonitrile (total 20 cm.³) and dried under reduced pressume (20 mm. Hg). 11-(1-methyl-4-piperidyl)dibenzo[a,d]cycloheptadiene (10.9 g., M.P. 105–106°) is obtained.

The 1-methyl - 4 - (11 - dibenzo[a,d]cycloheptatrienyl) pyridinium bromide starting material may be obtained in the following manner:

(a) Preparation of 11-oxo-dibenzo[a,d]cycloheptadiene according to N. J. Leonard and collaborators, J. Amer. Chem. Soc. 77, 5081 (1955).

(b) Preparation of 11-hydroxy-11-(4-pyridyl)dibenzo[a,d]cycloheptadiene (34.5 g., M.P. 218°) by reacting 4-pyridyl-lithium, prepared from 4-bromopyridine (126 g.), with 11-oxo-dibenzo[a,d]cycloheptadiene (83.2 g.) in ether at −70°.

(c) Preparation of 11-(4-pyridyl)dibenzo[a,d]cycloheptatriene (7.7 g., M.P. 134–135°), by reacting a 2 N aqueous solution of methanesulphonic acid (80 cm.³), with 11-hydroxy-11-(4-pyridyl)dibenzo[a,d]cycloheptadiene (10.2 g.) under reflux for 72 hours.

(d) Preparation of 1-methyl-4-(11-dibenzo[a,d]cycloheptatrienyl)-pyridinium bromide (17.8 g., M.P. 230–235°), by reacting methyl bromide (55 g.) dissolved in acetonitrile (60 cm.³) with 11-(4-pyridyl)dibenzo[a,d]cycloheptatriene (13.2 g.) for 3 hours at 80°.

EXAMPLE 2

A solution of 4-(2-chloro-11-dibenzo[a,b]cycloheptatrienyl)-1-methylpyridinium bromide (9.2 g.) in a mixture of ethanol (130 cm.³) and distilled water (35 cm.³), is hydrogenated at ambient temperature and pressure in the presence of an Adams platinum catalyst (1.2 g.) for 13 hours. The catalyst is then removed by filtration and the resulting solution is evaporated. The residue is taken up in a mixture of distilled water (80 cm.³), 2 N aqueous solution of methanesulphonic acid (40 cm.³) and ether (100 cm.³). The decanted acid solution is washed with ether (80 cm.³) and then rendered alkaline with 10 N caustic soda (50 cm.³). The oil which separates out is extracted twice with ether (total 300 cm.³). The combined ethereal extracts are dried over potassium carbonate and evaporated. The residue (7.3 g.) is dissolved in a boiling mixture of acetonitrile (15 cm.³) and distilled water (5 cm.³). After cooling for 17 hours to 5°, the crystals formed are filtered off, washed with a mixture of ice-cold acetonitrile (3 cm.³) and ice-cold distilled water (1 cm.³) and dried under reduced pressure. 2-chloro-11 - (1 - methyl-4-piperidyl)dibenzo[a,d]cycloheptadiene (4.55 g., M.P. 85–86°) is obtained.

The 4 - (2 - chloro-11-dibenzo[a,d]cycloheptatrienyl)-1-methylpyridinium bromide starting material may be prepared in the following manner:

(a) Preparation of methyl 2-(4-chlorobenzyl)benzoate, an oily product distilling at 170–175° under reduced pressure (0.3 mm. Hg), by esterification of 2-(4-chlorobenzyl)benzoic acid.

(b) Reduction of methyl 2-(4-chlorobenzyl)benzoate with lithium aluminium hydride in tetrahydrofuran to produce 2-(4-chlorobenzyl)benzyl alcohol (B.P. 180–184° 0.35 mm. Hg).

(c) Conversion of 2-(4-chlorobenzyl)benzyl alcohol, by reaction with hydrobromic acid, into 2-(4-chlorobenzyl)benzyl bromide (M.P. 58°).

(d) Preparation of 2-(4-chlorobenzyl)phenylacetonitrile distilling at 168–170° under reduced pressure (0.3 mm. Hg) by reacting 2-(4-chlorobenzyl)benzyl bromide with potassium cyanide in a water/ethanol medium.

(e) Hydrolysis of 2-(4-chlorobenzyl)phenylacetonitrile to 2-(4-chlorobenzyl)phenylacetic acid (M.P. 140°).

(f) Cyclisation of 2-(4-chlorobenzyl)phenylacetic acid to 2-chloro - 11 - oxo-dibenzo[a,d]cycloheptadiene (M.P. 104°) by heating a mixture of the acid with a mixture of orthophosphoric acid and phosphorus pentoxide.

(g) Preparation of 2-chloro-11-hydroxy-11-(4-pyridyl)dibenzo[a,d]cycloheptadiene (37.2 g., M.P. 238°), by reaction of 4-pyridyl-lithium prepared from 4-bromopyridine (111 g.), with 2-chloro - 11 - oxo-dibenzo[a,d]cycloheptadiene (85.0 g.).

(h) Preparation of 2 - chloro - 11 - (4-pyridyl)dibenzo [a,d]cycloheptatriene (5.6 g., M.P. 184–185°), by reaction of acetic anhydride with 2-chloro-11-hydroxy-11-(4-pyridyl)dibenzo[a,d]cycloheptadiene (7.0 g.) in acetic acid in the presence of perchloric acid.

(i) Preparation of 4-(2-chloro-11-dibenzo[a,d]cycloheptatrienyl)-1-methylpyridinium bromide (7.1 g., M.P. 220–230°) by reaction of methyl bromide (30 g.) dissolved in acetonitrile (30 cm.³) with 2-chloro-11-(4-pyridyl)dibenzo[a,d]cycloheptatriene (5.5 g.) for 4 hours at 80°.

EXAMPLE 3

A solution of 4-(11-dibenzo[a,d]cycloheptatrienyl)-1-benzylpyridinium bromide (40.5 g.) in a mixture of methanol (700 cm.³) and distilled water (140 cm.³) is hydrogenated at ambient temperature and pressure in the presence of an Adams platinum catalyst (5.0 g.). The hydrogenation is complete in 10 hours. The reaction mixture is diluted with methanol (150 cm.³), and heated under reflux (to dissolve the precipitated hydrobromide formed during the reaction). The catalyst is filtered off from the hot mixture and the solvents are evaporated under reduced pressure (20 mm. Hg). The residue is taken up in a mixture of distilled water (500 cm.³), 10 N caustic soda solution (30 cm.³) and methylene chloride (150 cm.³). The decanted organic solution is washed twice with distilled water (total 300 cm.³), dried over anhydrous sodium sulphate and evaporated. The residue (29.3 g.) is recrystallised from boiling acetonitrile (65 cm.³). After cooling in an ice bath for 3 hours, the crystals formed are filtered off, washed with ice-cold acetonitrile (8 cm.³) and dried under reduced pressure (20 mm. Hg). 11-(1-benzyl-4-piperidyl)dibenzo[a,d]cycloheptadiene (24.0 g., M.P. 132–133°) is obtained.

4 - (11 - dibenzo[a,d]cycloheptatrienyl) - 1 - benzylpyridinium bromide (40.5 g.) is obtained by reacting benzyl bromide (25.6 g.) with 11-(4-pyridyl)dibenzo[a,d]cycloheptatriene (26.9 g.) in acetonitrile (400 cm.³) under reflux for 7 hours.

EXAMPLE 4

11 - (1 - benzyl-4-piperidyl)dibenzo[a,d]cycloheptadiene (93.8 g.) dissolved in ethanol (1800 cm.³) is hydrogenated in the presence of palladium on charcoal (10 g.) (containing 1 g. of palladium) at an initial pressure of 80 bars, at 80° for 8 hours. After cooling, the catalyst is filtered off and washed twice with acetone (total 2500 cm.³). The filtrate is evaporated and the residue (70.4 g.) recrystallised from boiling ethyl acetate (250 cm.³). After cooling, filtering and drying, 11 - (4 - piperidyl)dibenzo[a,d]cycloheptadiene (61.0 g., M.P. 138–139°) is obtained.

EXAMPLE 5

A mixture consisting of 11-(4-piperidyl)dibenzo[a,d] cycloheptadiene (8.5 g.), ethyl iodide (5.0 g.), sodium bicarbonate (5.4 g.) and dimethylformamide (100 cm.³), is heated for one hour at 85°, a further two hours at 120°, and finally for four hours at 135°. After cooling, the solvents are evaporated under reduced pressure. The residue is taken up in a mixture of methylene chloride (50 cm.³) and distilled water (50 cm.³). The decanted organic solution is washed three times with distilled water (total 150 cm.³), dried over anhydrous sodium sulphate and evaporated. The residue (9.6 g.) is crystallised from acetonitrile (30 cm.³). 11-(1-ethyl-4-piperidyl) dibenzo[a,d]cycloheptadiene (5.3 g. M.P. 94–95°) is obtained.

EXAMPLE 6

A mixture consisting of 11-(4-piperidyl)dibenzo[a,d] cycloheptadiene (8.3 g.), ethylene chlorohydrin (2.55 g.), sodium bicarbonate (5.4 g.) and dimethylformamide (100 cm.³) is heated for 7 hours at 140°. After evaporating the solvent, the residue is taken up in a mixture of benzene (100 cm.³) and distilled water (100 cm.³). The organic solution is washed three times with distilled water (total 150 cm.³), dried over anhydrous sodium sulphate, and evaporated. The residue (10 g.) is crystallised from acetonitrile (30 cm.³). 11-(1-hydroxyethyl-4-piperidyl)dibenzo[a,d]cycloheptadiene (6.7 g., M.P. 108–110°) is obtained.

EXAMPLE 7

A mixture consisting of 11-(4-piperidyl)dibenzo[a,d] cycloheptadiene (8.5 g.), propyl bromide (3.9 g.), sodium bicarbonate (5.4 g.) and dimethylformamide (100 cm.³), is heated for 2 hours at 100°, for a further 2 hours at 120°, and then for 4 hours at 130°. After evaporating the solvent, the residue is taken up in a mixture of methylene chloride (100 cm.³) and distilled water (100 cm.³). The organic solution is washed three times with distilled water (total 150 cm.³), dried over anhydrous sodium sulphate and evaporated. The residue (9.4 g.) is dissolved in benzene (250 cm.³) and chromatographed on alumina (120 g.). Benzene is used for the elution. The first 6 fractions (each 250 cm.³) are combined and evaporated. The residue (7.8 g.) is treated with maleic acid (3.6 g.) in boiling isopropanol (100 cm.³). After cooling, the crystals formed are filtered off, washed and dried. The maleate obtained (9.3 g.) is recrystallised from isopropanol (80 cm.³). 11 - (1 - propyl - 4 - piperidyl)dibenzo[a,d]cycloheptadiene maleate (7.7 g., M.P. 162–163°) is isolated.

EXAMPLE 8

A mixture consisting of 11-(4-piperidyl)dibenzo[a,d] cycloheptadiene (8.3 g.), chloroethoxyethanol (4.3 g.), sodium bicarbonate (5.4 g.) and dimethylformamide (100 cm.³) is heated for 6 hours at 135°. After working up, the resulting residue (10.7 g.) is chromatographed on alumina (120 g.) using benzene as the eluting agent. The fractions are combined and evaporated. The residue (9.4 g.) is treated with fumaric acid (7.0 g.) in boiling ethanol (160 cm.³). After cooling, the crystalline fumarate is filtered off, washed and dried. 11-(1-hydroxyethoxyethyl-4-piperidyl)dibenzo[a,d]cycloheptadiene fumarate (9.6 g., M.P. 154–155°) is obtained.

EXAMPLE 9

A mixture of 11-(4-piperidyl)dibenzo[a,d]cycloheptadiene (8.3 g.), allyl chloride (2.4 g.), sodium bicarbonate (5.4 g.) and dimethylformamide (100 cm.³) is heated for 20 hours at 60°. After the usual treatment, the residue (8.7 g.) is crystallised from acetonitrile (30 cm.³). 11 - (1 - allyl - 4 - piperidyl)dibenzo[a,d]cycloheptadiene (6.4 g., M.P. 80–82°) is obtained.

EXAMPLE 10

A mixture of 11-(4-piperidyl)dibenzo[a,d]cycloheptadiene (8.3 g.), propargyl chloride (2.4 g.), sodium bicarbonate (5.4 g.) and dimethylformamide (100 cm.³), is heated for 20 hours at 60°. After working up, and after chromatography on alumina (with elution with a mixture of equal volumes of benzene and cyclohexane), a crude product (8.7 g.) is obtained which is then crystallised from cyclohexane (50 cm.³). 11-(1-propargyl-4-piperidyl) dibenzo[a,d]cycloheptadiene (6.4 g., M.P. 104–105°) is obtained.

EXAMPLE 11

A mixture of 11-(4-piperidyl)dibenzo[a,d]cycloheptadiene (8.3 g.), 4-methoxybenzyl chloride (4.9 g.), sodium bicarbonate (5.4 g.) and dimethylformamide (100 cm.³) is heated at 130° for 7 hours. After working up, the residue is crystallised from acetonitrile (50 cm.³). 11-[1-(4-methoxybenzyl) - 4 - piperidyl]dibenzo[a,d]cycloheptadiene (10.2 g., M.P. 132–133°) is obtained.

EXAMPLE 12

4 - (2 - chloro - 11 - dibenzo[a,d]cycloheptatrienyl) - 1-(4-methoxybenzyl)pyridinium bromide (12.0 g.) dissolved in a mixture of ethanol (300 cm.³) and distilled water (100 cm.³) is hydrogenated at ambient temperature and pressure in the presence of an Adams platinum catalyst (1.5 g.). The reaction is complete in 24 hours. After treating the product as in Example 1, a crude base (9.5 g.) is obtained which, when dissolved in anhydrous acetone and treated with ethereal hydrogen chloride, yields 2-chloro - 11 - [1 - (4 - methoxybenzyl) - 4 - piperidyl] dibenzo[a,d]cycloheptadiene hydrochloride (8.4 g., M.P. initially about 210°, and then 224–228°).

4 - (2 - chloro - 11 - dibenzo[a,d]cycloheptatrienyl) - 1-(4-methoxybenzyl)pyridinium bromide (19.2 g., M.P. 263–265°) is obtained by reacting 4-methoxybenzyl bromide (11.2 g.) with 2-chloro-11-(4-pyridyl)dibenzo[a,d] cycloheptatriene (12.15 g.) in acetonitrile under reflux for 7 hours.

EXAMPLE 13

4 - (2 - chloro - 11 - dibenzo[a,d]cycloheptatrienyl) - 1-benzylpyridinium bromide (9.2 g.) dissolved in a mixture of ethanol (300 cm.³) and distilled water (100 cm.³) is treated as in Example 10. The crude product is recrystallised from ethyl acetate. 2-chloro-11-(1-benzyl-4-piperidyl)-dibenzo[a,d]cycloheptadiene (3.6 g., M.P. 156–158°) is obtained.

4 - (2 - chloro - 11 - dibenzo[a,d]cycloheptatrienyl) - 1-benzylpyridinium bromide (17.9 g., M.P. 266–268°) is obtained by reacting benzyl bromide (9.5 g.) with 2-chloro - 11 - (4 - pyridyl)dibenzo[a,d]cycloheptatriene (12.15 g.) in acetonitrile under reflux for 7 hours.

EXAMPLE 14

4 - (2 - methoxy - 11 - dibenzo[a,d]cycloheptatrienyl)-1-methylpyridinium bromide (11.8 g.) dissolved in a mixture of ethanol (150 cm.³) and distilled water (37 cm.³) is hydrogenated at ambient temperature and pressure in the presence of an Adams platinum catalyst (1.2 g.). The reaction is complete in 7 hours. After filtering off the catalyst and concentrating, the residue is treated with fumaric acid in ethanol. 2 - methoxy - 11 - (1 - methyl-4 - piperidyl)dibenzo[a,d]cycloheptadiene fumarate (10.1 g., M.P. 207–209°) is obtained.

The 4 - (2 - methoxy - 11 - dibenzo[a,d]cycloheptatrienyl)-1-methylpyridinium bromide starting material may be prepared in the following manner:

(a) Preparation of 2 - methoxy-11-(4-pyridyl)dibenzo [a,d]cycloheptatriene (13.5 g., M.P. 196–197°) by reaction of a mixture of acetic anhydride and perchloric acid in acetic acid with 2-methoxy-11-hydroxy-11-(4-pyridyl) dibenzo[a,d]cycloheptadiene (15.6 g.).

(b) Preparation of 4 - (2 - methoxy - 11 - dibenzo[a,d] cycloheptatrienyl)-1-methylpyridinium bromide (16.3 g., M.P. 263–267°) by reaction of an excess of methyl bromide with 2 - methoxy-11-(4-pyridyl)dibenzo[a,d]cycloheptatriene (13.2 g.) in acetonitrile at 80°.

The 2 - methoxy - 11 - hydroxy - 11 - (4 - pyridyl) dibenzo[a,d]cycloheptadiene (M.P. 226°) may be prepared by reacting 4-pyridyl-lithium, prepared from 4-bromopyridine, with 2 - methoxy-11-oxo-dibenzo[a,d]cycloheptadiene in ether at −70°.

The 2 - methoxy - 11 - oxo-dibenzo[a,b]cycloheptadiene may be prepared via the following intermediates:

2-(4-methoxybenzoyl) benzoic acid, prepared according to A. Lin-Che-Kin, Ch. 13, 317 (1940);

2-(4-methoxybenzyl)benzoic acid (M.P. 111–112°);

Methyl 2-(4-methoxybenzyl)benzoate (B.P.$_{0.3}$ 150–160°);

2-(4-methoxybenzyl)benzyl alcohol (B.P.$_{0.2}$ 170–180°);

2-(4-methoxybenzyl)benzyl chloride (B.P.$_{0.7}$ 150–158°);
2-(4-methoxybenzyl)phenylacetonitrile (M.P. 65°);
2-(4-methoxybenzyl)phenylacetic acid (M.P. 70°)
which is cyclised to 2-methoxy-11-oxo-dibenzo[a,d]cycloheptadiene (M.P. 82–84°) by reaction with a mixture of orthophosphoric acid and phosphorus pentoxide.

EXAMPLE 15

4-(2-methylthio-11 - dibenzo[a,d]cycloheptatrienyl)-1-methyl-pyridinium bromide (9.5 g.) dissolved in a mixture of ethanol (115 cm.³) and distilled water (28.5 cm.³) is hydrogenated at ambient temperature at a pressure of 50 bars for 24 hours. After filtering off the catalyst and treating the product as in Example 1, a crude base (5.5 g.) is isolated. On treatment with anhydrous oxalic acid in acetone, 2-methyl-thio-11-(1-methyl-4-piperidyl)dibenzo-[a,d]cycloheptadiene oxalate (6.6 g., M.P. 165–169°) is obtained.

The 4-(2-methylthio - 11 - dibenzo[a,d]cycloheptatrienyl)-1-methylpyridinium bromide starting material may be prepared as follows:

(a) Preparation of 2-methylthio-11-(4-pyridyl)dibenzo[a,d]-cycloheptatriene (16.5 g., M.P. 177–179°) as in Example 12, starting from 2-methylthio-11-hydroxy-11-(4-pyridyl)dibenzo[a,d]cycloheptadiene (20.0 g.).

(b) Preparation of 4-(2-methylthio-11-dibenzo[a,d]-cycloheptatrienyl)-1-methylpyridinium bromide (9.6 g., M.P. 245–249°) as in Example 12, starting from 2-methyltio-11-(4-pyridyl)dibenzo[a,d]cycloheptatriene 8.0 g.).

The 2-methylthio-11-hydroxy-11-(4 - pyridyl)dibenzo-[a,d]cycloheptadiene (M.P. 244–245°) may be prepared by reaction of 4-pyridyllithium, prepared from 4-bromopyridine, with 2-methylthio-11-oxo-dibenzo[a,d]cycloheptadiene in ether at —70°.

The 2-methylthio-11-oxo-dibenzo[a,d]cycloheptadiene may be prepared via the following intermediates:

2-(4-methylthiobenzyl)benzoic acid (M.P. 129°);
Methyl 2-(4-methylthiobenzyl)benzoate;
2-(4-methylthiobenzyl)benzyl alcohol (M.P. 70°);
2-(4-methylthiobenzyl)benzyl chloride;
2-(4-methylthiobenzyl)phenylacetonitrile (M.P. 75–76°);
2-(4-methylthiobenzyl)phenylacetic acid (M.P. 138°)

which is cyclised to give 2-methylthio-11-oxo-dibenzo-[a,d]cycloheptadiene (M.P. 104°) by heating in the presence of a mixture of orthophosphoric acid and phosphorus pentoxide.

EXAMPLE 16

4 - (2-bromo-11-dibenzo[a,d]cycloheptatrienyl) - 1 - methylpyridinium bromide (4.65 g.) dissolved in a mixture of ethanol (80 cm.³) and distilled water (20 cm.³) is hydrogenated at ambient temperature and at 50 bars pressure for 1 hour in the presence of an Adams platinum catalyst (0.45 g.). After filtering off the catalyst and treating the product as in Example 1, a crude base (3.4 g.) is isolated. On treatment with ethereal hydrogen chloride in acetone, 2-bromo-11-(1-methyl-4-piperidyl)dibenzo[a,d]cycloheptadiene hydrochloride (2.9 g., M.P. 208–212°) is obtained.

The 4-(2-bromo-11-dibenzo[a,d]cycloheptatrienyl)-1-methylpyridinium bromide starting material may be prepared in the following manner:

(a) Preparation of 2-bromo-11-(4-pyridyl)dibenzo-[a,d]cycloheptatriene (17.6 g., M.P. 202–204°) as in Example 12, starting with 2-bromo-11-hydroxy-11-(4-pyridyl)dibenzo[a,d]cycloheptadiene (20.1 g.).

(b) Preparation of 4-(2-bromo-11-dibenzo[a,d]cycloheptatrienyl)-1-methylpyridinium bromide (20.2 g., M.P. 270°) as in Example 12, starting from 2-bromo-11-(4-pyridyl)dibenzo[a,d]cycloheptatriene (17.4 g.).

The 2-bromo-11-hydroxy-11-(4-pyridyl)dibenzo[a,d]-cycloheptadiene (M.P. 263°) may be prepared by reaction of 4-pyridyl-lithium, prepared from 4-bromopyridine, with 2-bromo-11-oxo-dibenzo[a,d]cycloheptadiene in ether at —70°.

The 2-bromo-11-oxo-dibenzo[a,d]cycloheptadiene may be prepared via the following intermediates:

Methyl 2-(4-bromobenzyl)benzoate (M.P. 56°);
2-(4-bromobenzyl) alcohol (B.P.$_{0.2}$ 165–167°);
2-(4-bromobenzyl)benzyl bromide (M.P. 72°);
2-(4-bromobenzyl)phenylacetonitrile (B.P.$_{0.5}$ 175–178°);
2-4-bromobenzyl)phenylacetic acid (M.P. 166°)

which is cyclised to give 2-bromo-11-oxo-dibenzo[a,d]-cycloheptadiene (M.P. 106°) by heating in the presence of orthophosphoric acid and phosphorus pentoxide.

The present invention includes within its scope pharmaceutical compositions containing, as active ingredient, at least one of the dibenzocycloheptadiene derivatives of Formula I, or pharmaceutically acceptable acid addition or quaternary ammonium salts thereof, either in pure state or in association with a pharmaceutical carrier or coating. The invention includes such compositions made up for oral, parenteral or rectal administration.

Solid compositions for oral administration include tablets, pills, powders and granules. In such compositions, the active product is mixed with one or more inert diluents such as sucrose, lactose or starch. These compositions may also contain additional substances other than the diluents, for example lubricants such as magnesium stearate.

Liquid compositions for oral administration include pharmaceutically acceptable emulsions, solutions, suspensions, syrups and elixirs containing inert diluents such as water or liquid paraffin. These compositions may also comprise other substances besides diluents, for example wetting agents, sweeteners and perfumes.

Compositions for parenteral administration may be sterile aqueous or non-aqueous solutions, suspensions or emulsions. Examples of non-aqueous solvents or vehicle include propylene glycol, polyethylene glycol, vegetable oils, especially olive oil, and injectable organic esters such as ethyl oleate. These compositions may also contain adjuvants, particularly wetting, emulsifying and dispersing agents. Sterilisation may be carried out in various ways, for example by means of filtration through a bacteria-retaining filter, by incorporating sterilising agents in the composition, by irradiation or by heating. The products may also be prepared in the form of solid sterile compositions which may be dissolved in sterile water or in any other sterile injectable medium at the time of use.

Compositions for rectal administration in the form of suppositories contain, apart from the active ingredient, excipients such as cocoa butter or a suitable wax.

The dosages to be used depend on the desired therapeutic effect, the method of administration and the duration of the treatment. In the case of oral administration, the dose may generally be between 5 mg. and 200 mg. of active product per day for adults.

The following examples illustrate pharmaceutical compositions according to the invention:

Example A

Tablets of the following composition are prepared by the usual methods:

| | Mg. |
|---|---|
| 11 - (1 - methyl - 4 - piperidyl)dibenzo[a,d]cycloheptadiene | 2.5 |
| Starch | 110 |
| Colloidal silica | 35 |
| Magnesium stearate | 2.5 |

Example B

| | Mg. |
|---|---|
| 2 - chloro - 11 - (1 - methyl - 4 - piperidyl)dibenzo-[a,d]cycloheptadiene | 2.5 |
| Starch | 110 |
| Colloidal silica | 35 |
| Magnesium stearate | 2.5 |

I claim:
1. A member selected from the group consisting of dibenzo[a,d]cycloheptadiene derivative of the formula:

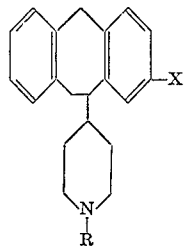

and its pharmaceutically acceptable acid addition and quaternary ammonium salts, in which R is hydrogen, alkyl of 1 to 5 carbon atoms, alkenyl of 2 to 5 carbon atoms, alkynyl of 2 to 5 carbon atoms, hydroxyalkyl of 1 to 5 carbon atoms, hydroxyalkoxyalkyl of 1 to 5 carbon atoms in each alkyl residue, or phenylalkyl of 1 to 5 carbon atoms in the alkyl residue and optionally substituted in the phenyl nucleus by one or more alkoxy of 1 to 5 carbon atoms, and X is hydrogen, halogen, alkoxy of 1 to 5 carbon atoms or alkylthio of 1 to 5 carbon atoms.

2. A compound according to claim 1 selected from the group consisting of dibenzo[a,d]cycloheptadiene derivative of the formula:

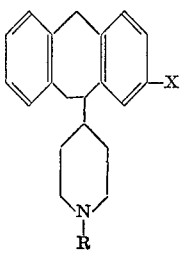

and its pharmaceutically acceptable acid addition and quaternary ammonium salts, in which X is hydrogen, halogen, alkoxy of 1 to 5 carbon atoms, or alkylthio of 1 to 5 carbon atoms, and R is alkyl of 1 to 5 carbon atoms, or phenylalkyl of 1 to 5 carbon atoms in the alkyl residue, the phenyl nucleus being unsubstituted or substituted by alkoxy of 1 to 5 carbon atoms.

3. A compound according to claim 1 selected from the group consisting of 2 - chloro - 11 - (1 - methyl - 4-piperidyl)-dibenzo[a,d]cycloheptadiene and its pharmaceutically acceptable acid addition and quaternary ammonium salts.

4. A compound according to claim 1 selected from the group consisting of 2 - chloro - 11[1 - (4 - methoxybenzyl) - 4 - piperidyl]-dibenzo[a,d]cycloheptadiene and its pharmaceutically acceptable acid addition and quaternary ammonium salts.

5. A compound according to claim 1 selected from the group consisting of 2 - chloro - 11 - (1 - benzyl-4-piperidyl) - dibenzo[a,d]cycloheptadiene and its pharmaceutically acceptable acid addition and quaternary ammonium salts.

6. A compound according to claim 1 selected from the group consisting of 2 - methoxy - 11 - (1 - methyl-4 - piperidyl) - dibenzo[a,d]cycloheptadiene and its pharmaceutically acceptable acid addition and quaternary ammonium salts.

7. A compound according to claim 1 selected from the group consisting of 2 - methylthio - 11 - (1-methyl-4 - piperidyl) - dibenzo[a,d]cycloheptadiene and its pharmaceutically acceptable acid addition and quaternary ammonium salts.

8. A compound according to claim 1 selected from the group consisting of 2 - bromo - 11 - (1 - methyl-4 - piperidyl) - dibenzo[a,d]cycloheptadiene and its pharmaceutically acceptable acid addition and quaternary ammonium salts.

References Cited
UNITED STATES PATENTS 3,100,207  9/1963  Zirkle _____ 260—268

HENRY R. JILES, Primary Examiner

G. THOMAS TODD, Assistant Examiner

U.S. Cl. X.R.
260—293.4, 294.7, 465, 999